UNITED STATES PATENT OFFICE.

FRANCIS J. CLAMER AND JOSEPH G. HENDRICKSON, OF PHILADELPHIA, PA.

COMPOSITION TO BE USED IN FLUXING AND PROTECTING MOLTEN METALS.

SPECIFICATION forming part of Letters Patent No. 280,349, dated July 3, 1883.

Application filed October 4, 1882. (Specimens.)

*To all whom it may concern:*

Be it known that we, FRANCIS J. CLAMER and JOSEPH G. HENDRICKSON, citizens of the United States, residing at Philadelphia, in the county of Philadelphia and State of Pennsylvania, have invented certain new and useful Improvements in Composition to be used in Fluxing and Protecting Molten Metals; and we do declare the following to be a full, clear, and exact description of the invention, such as will enable others skilled in the art to which it appertains to make and use the same.

When brass, zinc, lead, copper, or similar metals are melted in a crucible or like furnace, the surface of the melted metal is rapidly oxidized by coming in contact with the air, and a large percentage of the metal passes off in the flame of the furnace and is thus lost.

The object of our invention is to produce a composition that will serve as a flux and at the same time form a floating air-tight cover on the surface of the melted metal, thus preventing oxidization and allowing none of the metal to pass off as vapor with the flame.

Our composition consists of the following ingredients, in the proportions stated: two parts, by weight, of air-slaked lime; one part, by weight, of sal-ammoniac; one part, by weight, of pulverized asbestus. The lime is first mixed with the sal-ammoniac, and the two well stirred together, after which the asbestus is added, and the whole thoroughly mixed. The mixture is then ready for use, and should be placed in the crucible, about the time the metal begins to melt, in the proportion of one pound of the mixture to every hundred pounds of metal. By adding small quantities of sal-ammoniac and lime the mixture may be used with new charges of metal several times, and is found to be much preferable to powdered charcoal for protecting the metal, as it forms a close and air-tight cover floating on the surface, thus preventing it from oxidizing or passing off with the flame, as above stated.

The proportions of the materials herein named may be varied somewhat. The best results, however, are obtained when the ingredients are used in about the quantities and in the manner specified.

Having thus described our invention, what we claim as new, and desire to secure by Letters Patent of the United States, is—

The herein-described composition of lime, sal-ammoniac, and asbestus, combined substantially as and for the purpose set forth.

In testimony whereof we affix our signatures in presence of two witnesses.

FRANCIS J. CLAMER.
JOSEPH G. HENDRICKSON.

Witnesses:
THOS. D. MOWLDS,
CHAS. F. VAN HORN.